United States Patent
Shetty et al.

(10) Patent No.: US 11,902,298 B2
(45) Date of Patent: Feb. 13, 2024

(54) DYNAMIC REMOTE BROWSING

(71) Applicant: VMWARE, INC., Palo Alto, CA (US)

(72) Inventors: Rohit Pradeep Shetty, Bangalore (IN); Sharun Varghese Samuel, Bangalore (IN); Neelima Bojja, Bangalore (IN); Erich Peter Stuntebeck, Atlanta, GA (US); Subramanian Kathiresan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 16/942,855

(22) Filed: Jul. 30, 2020

(65) Prior Publication Data

US 2021/0385234 A1 Dec. 9, 2021

(30) Foreign Application Priority Data

Jun. 4, 2020 (IN) .............................. 202041023514

(51) Int. Cl.
*H04L 9/40* (2022.01)
*G06F 3/0483* (2013.01)
*G06F 16/958* (2019.01)
*H04L 61/2503* (2022.01)
*H04L 67/50* (2022.01)

(52) U.S. Cl.
CPC ........ *H04L 63/1416* (2013.01); *G06F 3/0483* (2013.01); *G06F 16/958* (2019.01); *H04L 61/2503* (2013.01); *H04L 63/1433* (2013.01); *H04L 67/535* (2022.05)

(58) Field of Classification Search
CPC ............. H04L 63/1416; H04L 63/1433; H04L 63/1441; G06F 16/958; G06F 16/957; G06F 16/954; G06F 16/95
See application file for complete search history.

(56) References Cited

U.S. PATENT DOCUMENTS

| 10,387,546 | B1 * | 8/2019 | Duran | G06F 16/951 |
|---|---|---|---|---|
| 2017/0164290 | A1 * | 6/2017 | Arulesan | G06F 1/3212 |
| 2018/0068347 | A1 * | 3/2018 | Fernandes | G06F 16/9574 |
| 2018/0343179 | A1 * | 11/2018 | VanBlon | H04L 67/141 |
| 2019/0075130 | A1 * | 3/2019 | Petry | H04L 63/1433 |
| 2020/0036770 | A1 * | 1/2020 | Hu | H04L 67/08 |

* cited by examiner

*Primary Examiner* — Esther B. Henderson
(74) *Attorney, Agent, or Firm* — King Intellectual Asset Management

(57) ABSTRACT

A method for an electronic device for managing one or more browsing tabs of a browsing sessions is provided. The method receives a request for a browsing tab. The method determines whether to process the request for the browsing tab locally on the electronic device based on one or more parameters associated with at least one of the electronic device or a destination associated with the request. When it is determined to process the request locally, the method performs the browsing tab locally on the electronic device. However, when it is determined not to process the request locally, the method sends the request for the browsing tab to a remote server to perform the browsing tab remotely on the remote server.

21 Claims, 4 Drawing Sheets

DYNAMIC REMOTE BROWSING

RELATED APPLICATIONS

Benefit is claimed under 35 U.S.C. 119(a)-(d) to Foreign Application Serial No. 202041023514 filed in India entitled "DYNAMIC REMOTE BROWSING", on Jun. 4, 2020, by VMware, Inc., which is herein incorporated in its entirety by reference for all purposes.

BACKGROUND

A browser (also known as web browser) is an application through which a website can be accessed. When a user requests a particular website, the browser may retrieve the necessary content from a web server and then display a resulting webpage of the website on the user's device. Web application vulnerabilities (e.g., cross site scripting, cross site request forgery, etc.), however, can be easily exploited (e.g., by a hacker), which may result in compromising not only the user's device (and data), but all the other devices connected to the same network as the user's device. A single breach (e.g. inadvertently caused by a user) can be very costly for an enterprise. Statistically, 98% of external information security attacks may be carried over the public internet, while 80% of these attacks may directly target end user devices through the browsers running on the devices. As a result, enterprise companies are continuously in search of techniques for safeguarding device endpoints, for example, by using better firewalls, whitelisting of websites, effectuating stricter policies, etc.

Remote browsing is an option for safeguarding device endpoints. As the current security tools (e.g., antivirus applications, firewalls, intrusion detection and prevention softwares, etc.) may fail to prevent attackers from using malwares, ransomwares, and other browser-based cyber threats, many organizations have realized that browsers (along with all of the associated browsing activities) may not need to be connected to their internal networks and infrastructure. This fact has led to the adoption of remote browsing. In remote browsing, instead of using a local browser installed on a local machine to render a webpage with data from the public Internet (e.g., that may expose the local device to malware infections), a physically isolated browser hosted in a remote computer (e.g., in the cloud) may be used to render the webpage with data from the Internet and remotely display the rendered webpage on the local machine, such as via the local browser.

SUMMARY

Herein described are one or more embodiments of a method for managing one or more browsing tabs of a browsing sessions on an electronic device. The method includes receiving a request for a browsing tab and determining whether to process the request for the browsing tab locally on the electronic device based on one or more parameters associated with at least one of the electronic device or a destination associated with the request. The method further includes, when it is determined to process the request locally, performing the browsing tab locally on the electronic device. The method further includes, when it is determined not to process the request locally, sending the request for the browsing tab to a remote server to perform the browsing tab remotely on the remote server.

Also described herein are embodiments of a non-transitory computer readable medium comprising instructions to be executed in a computer system, wherein the instructions when executed in the computer system perform the method described above for managing one or more browsing tabs of a browsing sessions on an electronic device. For example, the instructions may include code or one or more instructions for performing each step of the method.

Also described herein are embodiments of a computer system, wherein software for the computer system is programmed to execute the method described above for managing one or more browsing tabs of a browsing sessions on an electronic device. For example, the computer system may include a processor coupled to a memory configured to perform each step of the method.

Also described herein are embodiments of a computer system comprising various means for executing the various steps of the method described above for managing one or more browsing tabs of a browsing sessions on an electronic device.

DETAILED DESCRIPTION

Remote browsing is a mechanism for browsing the Internet using a remote browser, for example, hosted in a host machine (or server) of a datacenter. It is an effective way of isolating the user device from malware, ransomware, and other types of cyber-attacks. Although remote browsing may improve the security of a local device, using a remote browser for every browsing session may be costly for both individuals and organizations for various reasons (e.g., exposure of highly sensitive information, high subscription fees for all the users of a company, etc.). For example, not all the users of an organization may connect to unsecured or resource hungry websites all the times, nor may every user download malicious content every time the user connects to the public Internet. Additionally, remote browsing may have a negative effect (e.g., compared to local browsing) on the performance of a device, for example, when real-time user transactions are required (e.g., filling out forms, playing video games, etc.).

Accordingly, some embodiments provide an efficient and secure method of accessing content (e.g., websites of the public Internet). In some embodiments, the method balances device protection (e.g., from cyber threats/attacks) and performance quality by dynamically determining whether to perform web browsing locally (e.g., on a user device) or remotely (e.g., on a remote server) based on a set of one or more criteria/parameters. In some embodiments, the method makes such dynamic determination for each browsing tab separately. For example, based on a set of parameters (e.g., related to device status, network status, website content, user status, etc.) the method may decide, in real-time, whether one or more specific browsing tabs, or an entire browsing session, should be transmitted to a remote server for remote browsing. As an example, if a device is deemed to be insecure, then the entire browsing session (including all of the browsing tabs) may be automatically transmitted to a remote sever for remote browsing. However, if a single browsing tab is deemed to be insecure (or resource hungry), the single tab may be automatically transmitted to the remote server for remote browsing.

Figure 1:
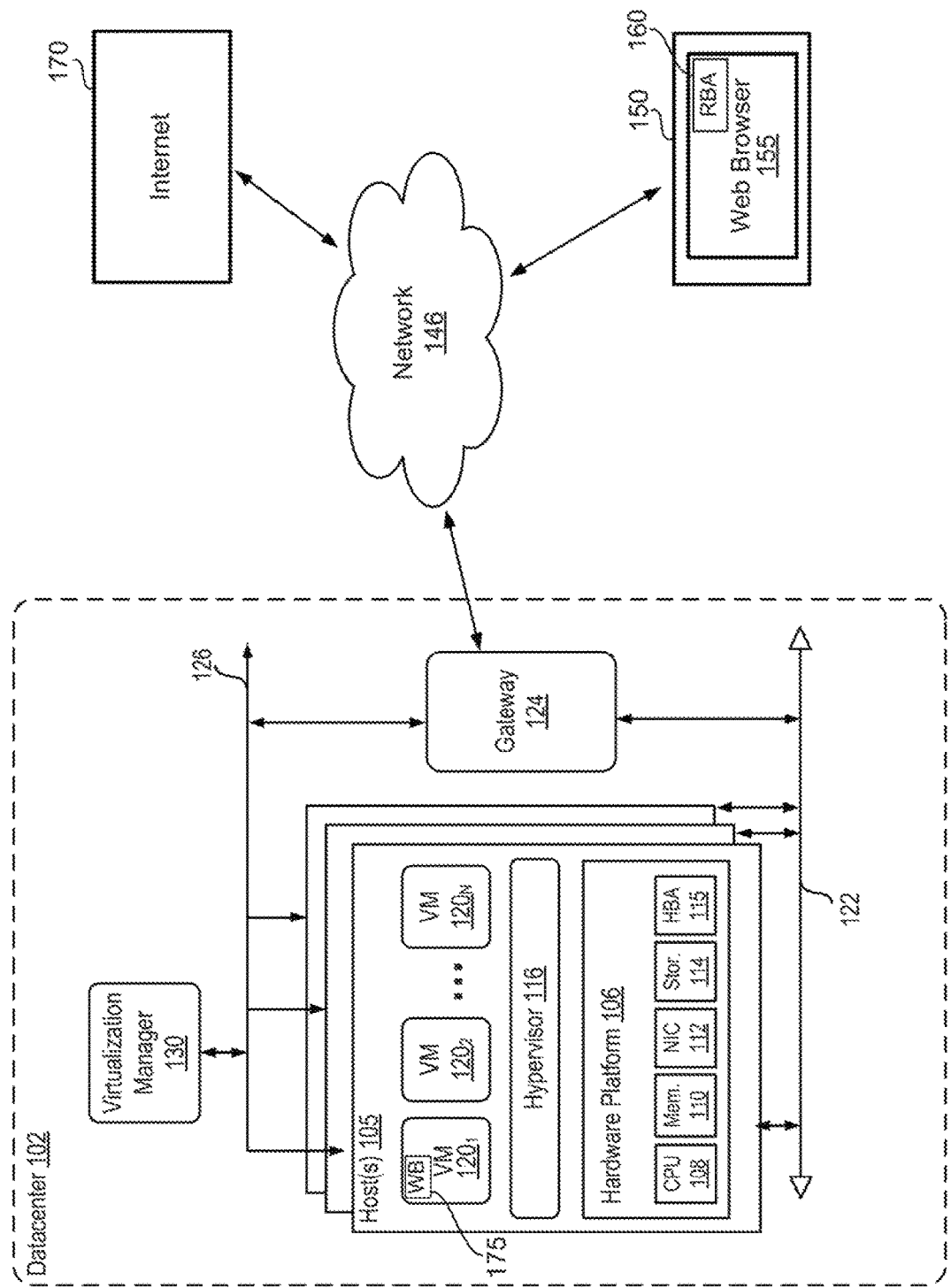
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 includes a datacenter 102 connected to a network 146. Network 146 may be, for example, a direct link, a local area network (LAN), a wide area network (WAN), such as the Internet, another type of network, or a combination of these networks.

Datacenter 102 includes host(s) 105, a virtualization manager 130, a gateway 124, a management network 126, and a data network 122. Datacenter 102 may include additional components (e.g., a disturbed data storage, etc.) that are not shown in the figure. Networks 122, 126, in one embodiment, may each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network (e.g., by using different VLAN identifiers).

Each of hosts 105 may be constructed on a server grade hardware platform 106, such as an x86 architecture platform. For example, hosts 105 may be geographically co-located servers on the same rack.

Hardware platform 106 of each host 105 includes components of a computing device, such as one or more central processing units (CPUs) 108, system memory 110, a network interface 112, storage system 114, a host bus adapter (HBA) 115, and other I/O devices, such as, for example, USB interfaces (not shown). Network interface 112 enables host 105 to communicate with other devices via a communication medium, such as data network 122 or management network 126. Network interface 112 may include one or more network adapters, which may also be referred to as network interface cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Host 105 may be configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines.

In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for datacenter 102, such as managing hosts 105, managing VMs 120 running within each host 105, provisioning VMs, migrating VMs from one host to another host, and load balancing between hosts 105. Virtualization manager 130 may be a computer program that resides and executes in a central server in datacenter 102 or, alternatively, virtualization manager 130 may run as a virtual computing instance (e.g., a VM) in one of the hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as including a hypervisor 116 and virtual machines 120, in an embodiment, hosts 105 may include a standard operating system instead of a hypervisor 116, and hosts 105 may not include VMs 120. In such an embodiment, datacenter 102 may not include virtualization manager 130.

Gateway 124 provides hosts 105, VMs 120, and other components in datacenter 102 with connectivity to one or more networks used to communicate with one or more remote datacenters or other entities, such as user device 150 and (one or more websites of) Internet 170. Gateway 124 may manage external public Internet Protocol (IP) addresses for VMs 120 and route traffic incoming to and outgoing from datacenter 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Device 150 may be any electronic device, such as a desktop computer, a laptop, a tablet, a smart phone, etc., that is capable of connecting to network 146 and executing a browsing application. A user may use browsing application 155 running on device 150 to access a website on Internet 170 either directly (e.g., through network 146) or remotely (e.g., through network 146 and one of VCIs 120 executing on host machine 105). For example, a remote browsing agent (RBA) or module 160 that runs on device 150 may receive a user request for browsing a particular website (e.g., a webpage of the website) on Internet 170. Remote browsing agent 160 may reside within web browsing application (or web browser) 155 (e.g., as shown in the figure) or may operate independently (e.g., from browsing application 155). After receiving the request, remote browsing agent 160 may determine the status/security of device 150, the status/security of network 146 (e.g., including a local network to which device 150 is connected), the status/security of the requested website (e.g., the content, behavior, and/or ranking of the target webpage), the status/security of the user of the device, and/or other browsing-related parameters. Based on such a determination, remote browsing agent 160 may instruct browsing application 155 to process the request locally and perform a browsing session on device 150, or alternatively, may transmit the request to datacenter 102 to perform the requested browsing session remotely, such as on a VCI 120 (e.g., a container, a VM, etc.). For example, as shown in FIG. 1, web browsing application 175 running on VM $120_1$ may perform the requested browsing session after this VM receives the instruction from remote browsing agent 160 (e.g., through hypervisor 116 of host machine 105).

Figure 2:
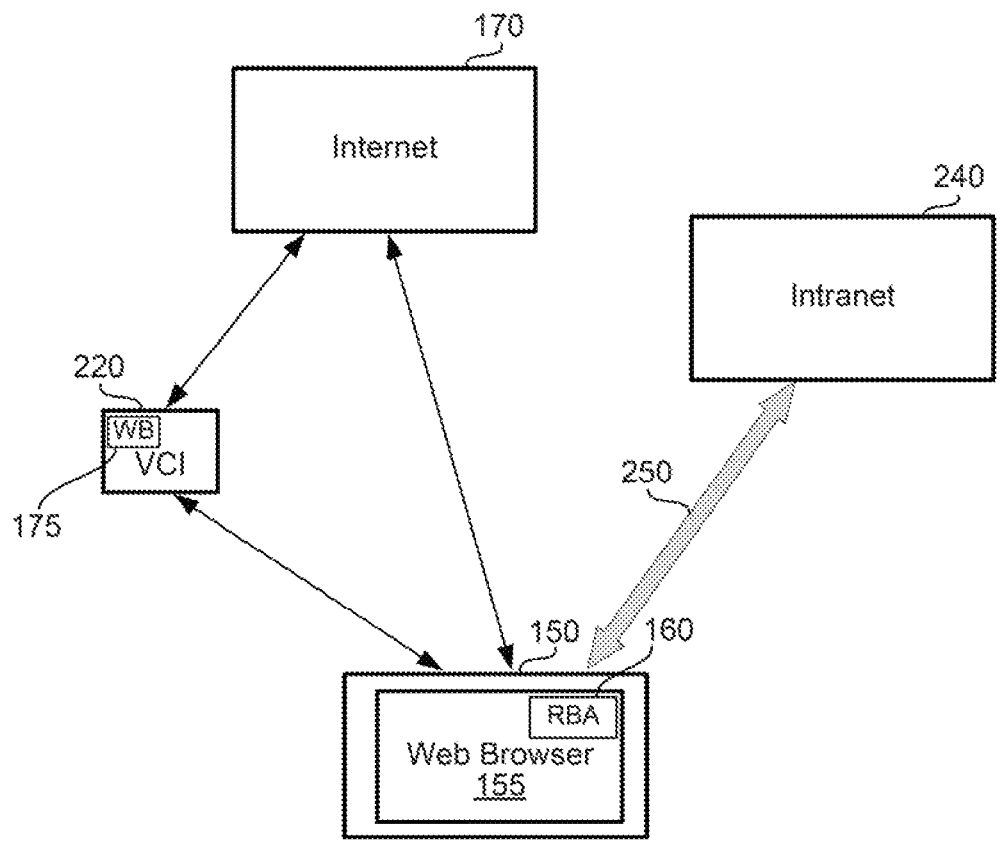
FIG. 2 illustrates local and remote browsing for accessing Internet and/or Intranet content, according to an example embodiment of the present application.

FIG. 2 illustrates local and remote browsing for accessing Internet and/or Intranet content, according to an example embodiment of the present application. FIG. 2 includes a user device 150, a VCI 220, Internet 170, and Intranet 240. Web browser 155 may be a web browsing application that runs on electronic device 150. As shown in the figure, in some embodiments, web browser 155 may include a remote browsing agent (RBA) or manager 160 (e.g., a component of VMware Airwatch® software development kit (SDK) provided by VMware®) that decides whether to perform local browsing or remote browsing for each browsing tab. As described above, this agent may reside outside web browser 155 in some other embodiments. Through remote browsing agent 160, web browser 155 may determine to perform a browsing session (or tab) locally (e.g., on electronic device 150) or remotely (e.g., on VCI 220).

For example, remote browsing agent 160 may receive (e.g., via web browser 155) a request (e.g., from a user, from another application, etc.) for opening a webpage of a website among the websites of Internet 170. Remote browsing agent 160 may determine, based on one or more parameters (e.g., related to the status/security of device, website, network, and/or the user, as discussed), whether to send the request to a datacenter (e.g., to VCI 220 in the datacenter) to perform the requested browsing session (e.g., via web browser 175 within VCI 220) or to perform the browsing session locally, for example, through web browser 155.

In some embodiments, for remote browsing, processing and rendering of the content may be handled by web browsing application (or web browser) 175, which runs on VCI 220, rather than web browsing application (or web browser) 155, which runs on user electronic device (or client device) 150. In some such embodiments, web browser 155 may receive user input (e.g., requesting a webpage) on client device 150 and forward the data associated with the user input to VCI 220. Subsequently, web browser 175 running on VCI 220 may process the user input data received by VCI 220. Conversely, web browser 155 may receive the processed and rendered content (e.g., associated with a requested webpage) from VCI 220 and display the webpage (e.g., using a remote display protocol) on client device 150.

In other words, in remote browsing, after receiving the user input (e.g., a request for browsing a webpage), web browser 175 may process the input and generate a request for the webpage, send the request to Internet 170, receive the corresponding content from Internet 170, process the content and render the webpage, and transmit the rendered content to client device 150 to be displayed by, for example, web browser 155 of client device 150. It should be noted that client device 150, VCI 220, and Internet 170 may exchange the aforementioned data using one or more private and/or public networks, such as network 146, as described above with reference to FIG. 1.

It should be noted that a browsing request may not be a request for starting a new browsing session in some embodiments. For example, the request may be a request for opening a new browsing tab in an ongoing browsing session (e.g., while one or more other browsing tabs are open). The remote browsing agent may determine, based on the one or more criteria/parameters, to perform remote browsing only for the new browsing tab, or for the entire browsing session after receiving such a request. Additionally, in some embodiments, the remote browsing agent may make a remote browsing determination without receiving a browsing request from a user. As an example, the remote browsing agent may receive a signal that indicates the battery of the device is running low during an ongoing local browsing session. As such, the remote browsing agent may determine to migrate the entire browsing session to a remote device (e.g., a VCI within a datacenter) to help save battery power.

Web browser 210 may also connect to Intranet 240 through one or more tunnels, such as tunnel 250, as shown in FIG. 2. Part or all of the content (e.g., database(s), webpage(s), etc.) of Intranet 240 may be on a private network (e.g., the same network to which client device 150 is coupled), on a public network, or a combination of both. An organization may utilize Intranet 240 for accessing private data of the organization by only users (e.g., employees) of the organization. As such, only a selected group of the users may access this private information after proper authentication (e.g., after the user ID and password of each user is authenticated). In order to do this, a mobile access gateway (MAG) may be utilized to perform the tunneling process. MAG may serve as a secure relay between the mobile users and the internal corporate content. To provide access securely to user devices, MAG may authenticate and encrypt all traffic to and from user devices to corporate systems where the data exists.

For example, in some embodiments, after receiving a user request (e.g., for browsing a webpage), remote browsing agent 160 of web browser 155 may determine that the corresponding content can be accessed at Intranet 240. Since no remote browsing is needed (e.g., since every access to Intranet 240's content should be authenticated first), remote browsing agent 160 may directly (e.g., using tunnel 250) access the content associated with the request from Intranet 240. Web browser 155 may then process the content and display the requested webpage on client device 150.

For example, web browser 155 may use MAG to establish tunnel 250 between client device 155 and another server that contains Intranet 240 data/content (e.g., a remote web server). Data may be exchanged between web browser 155 and the remote web server using a particular tunnel protocol (e.g., a Virtual Extensible Local Area Network (VXLAN), STT tunnel, Geneve tunnel). For example, the packets (e.g., corresponding to a user request for a browsing session) sent by web browser 155 may be encapsulated (e.g., by tunneling data), using a particular tunnel protocol, and after transmission to the remote web server may be decapsulated, using the same particular tunnel protocol. The packets (e.g., corresponding to content associated with the requested webpage) sent from the remote web server may also be encapsulated at the remote webserver (e.g., using a tunnel protocol) and after reaching client device 150 may be decapsulated using the same protocol. This way, only the members of an organization may access the private data of the organization through intranet 240.

Figure 3:
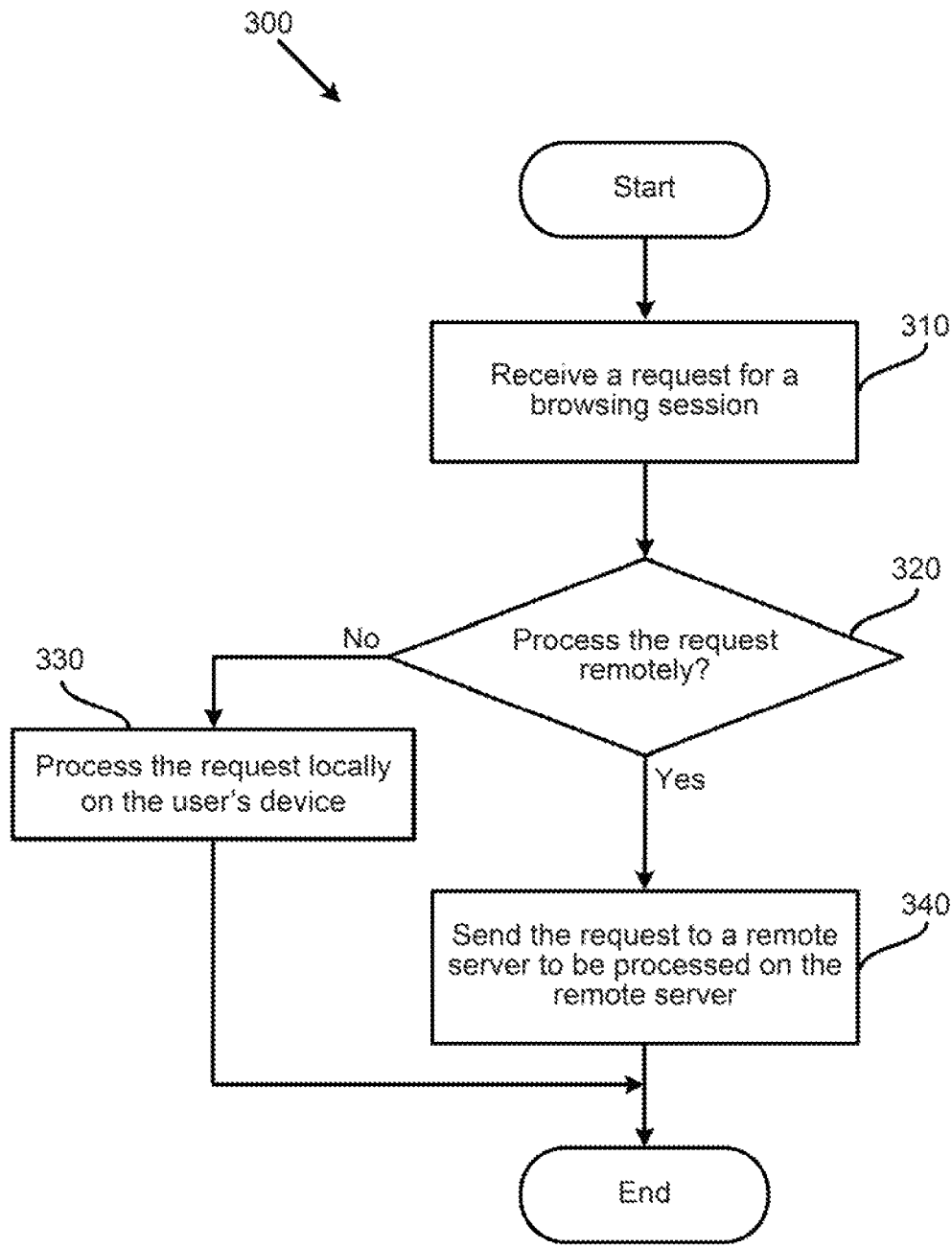
FIG. 3 is a flowchart illustrating an example process/method for dynamically determining whether to perform a browsing session locally or remotely based on one or more criteria, according to an example embodiment of the present application.

FIG. 3 is a flowchart illustrating an example process/method 300 for dynamically determining whether to perform a browsing session locally or remotely based on one or more criteria, according to an example embodiment of the present application. Process 300 may be performed, for example, by a remote browsing agent on a client device. Process 300 begins, at 310, by receiving a request for a browsing tab. As discussed above, the request may be received (e.g., from a user or from another process or application) to initiate a new browsing session by opening a new browsing tab of the browsing session in some embodiments. The request may also be received in the middle of a browsing session (e.g., when one or more other browsing tabs are open) to add a new browsing tab to the browsing session in some embodiments.

At 320, process 300 determines whether to process the request locally (e.g., on the electronic device on which process 300 is performed) or remotely (e.g., through a VCI 120 in datacenter 102, with reference to FIG. 1). This determination, as described above, may be made based on one or more parameters associated with the electronic device, a network to which the electronic device is coupled, a user (or application) that initiated the request, a destination associated with the request (e.g., a website, or a webpage of the website), etc.

For example, with respect to the status of the electronic device, the remote browsing agent may determine whether to perform remote browsing or local browsing based on the security ranking of the device. In some embodiments, the remote browsing agent receives security information (e.g., security feeds) about the device from a security agent that runs one the device (e.g., residing on the web browsing application or independent from the web browsing application) and monitors the security of the device. The security agent, in some embodiments, is a mobile device management (MDM) agent (or hub agent), or any other security-related agent (e.g., VMware Workspace ONE® Intelligent Hub provided by VMware®) that can rank the security of the device (e.g., as a secure device or insecure device). Some examples of the security parameters that the remote browsing agent receives from the security agent may include, but are not limited to, whether the operating system (OS) installed on the device is updated to the latest prescribed OS version, whether the device (or its OS) is jailbroken, whether there is any malicious application installed on the device, whether a mandated security software is installed and running on the device, etc. The security agent(s) may also gather information from different vendors and flag (and/or report) any suspicious activity performed on the device.

As described above, other events (e.g., non-security-related events, such as the status of the device) may also trigger the determination of whether to perform a browsing session (or tab) remotely or locally. For example, the remote browsing agent may receive a message (e.g., from the processor of the device) indicating that remote browsing may be preferable (e.g., when the device is running low on battery, storage, etc.). This message may be received in the middle of a browsing session. As such, the remote browsing agent may determine to migrate the entire browsing session (or one or more browsing tabs that are consuming a lot of resources) to a remote entity. In some embodiments, the remote browsing agent sends a notification to the user informing the user of such a migration. The user, in some such embodiments, may decide to proceed with the migration of the browsing session or may cancel the migration (e.g., after plugging the device to a power outlet). Of course, utilizing other solutions, such as lowering resolution (e.g., for images and/or video streams) for page rendering, may result in power conservation when there are resource hungry webpages during a browsing session.

Regarding the security of the network, web exploits and injections (e.g., a browsing application vulnerability that lets attackers execute arbitrary operating system commands on the browsing application's server) may occur when the device is connected to an unsecure network. In some embodiments, one or more parameters for remote browsing are associated with the security of the network, such as whether a public (or any non-corporate) network connection (e.g., WiFi connection) is used or all the network connections are private (e.g., Ethernet connections to the corporate network). Another network security parameter may be associated with integration with existing network tunneling rules. For example, any time a web browsing request is originating from a device with an IP address that is out of a particular IP address range, the network may be deemed unsecure (e.g., hence remote browsing may be used). Another network security parameter may include the physical location of the device. For example, in some embodiments, no remote browsing may be needed when the device is coupled to a trusted network (e.g., at a certain trusted site, such as a user's home or office). Not all the network-related parameters are associated with the network security in some embodiments. For example, a network-related parameter may include the network bandwidth provided to the device during a browsing session. When it is determined that the amount of data needed to be communicated during the browsing session may overwhelm the provided network bandwidth, the browsing session may be migrated for remote browsing.

Other parameters may relate to the website content, behavior, ranking, etc. For example, a website related parameter may include whether the web browser application used by the user is susceptible to a recently discovered flaw. Some embodiments may rely on open source feeds regarding security vulnerabilities (e.g., common vulnerabilities and exposures (CVE)) to obtain information about recently discovered flaws of a website (or a webpage of the website). Additionally, websites may use content on which exploits have been recently discovered on major browser engines. As an example a web session or page relying on local storage application programming interfaces (APIs) (or HTML5 Audio or other factors) may be decided to migrate to remote browsing if any exploits related to the same factors was discovered on major web engines. Additionally, often, web browsing exploits may occur through code injection or user tracking (e.g., fingerprinting). In some embodiments, when the remote browsing agent recognizes such attempts, the remote browsing agent may notify the user and migrate (e.g., after user confirmation) the local browsing session (or one or more browsing tabs) to a remote browser.

Another web-related parameter may include whether the web content is improperly rendered on the browser due to some hardware limitations. Additionally, when a webpage is too heavy which may result in slowing down or crashing a local browsing session, the webpage or web session may be automatically migrated to a remote entity for remote browsing. As remote browsing services (e.g., run on a remote entity) sanitize the web content and also have better hardware capabilities, this can provide a better experience to the user (e.g., by eliminating any lags or crashes). Another website-related parameter may be whether the website includes content that heavily rely on antiquated and highly exploited software or utilizes vulnerable mechanisms, such as cross-origin resource sharing or, for example, "SameSite=None" in cookies. If the remote browsing agent recognizes such content, the agent may send the request for remote browsing. For example, a remote browsing agent may scan the web content of a webpage prior to feeding the webpage to a rendering engine, and if the web content is determined to be relying on an exploited software or utilizing a vulnerable mechanism, the remote browsing agent may migrate the corresponding browsing tab (or the entire browsing session) for remote browsing. Some embodiments enable remote browsing on a website domain basis and/or based on the web page ranking or even corporate rules.

The parameters that have effect on remote browsing determination may also include user-related parameters in some embodiments. For example a user-related parameter may include the web browsing history of a user. As an example, based on the user information (e.g., user credentials), the remote browsing agent may determine whether the user is generally browsing secure websites or has a habit of browsing insecure websites. Other metrics related to a user may be received from, for example, a security monitoring application or process that runs on the device of the user, such as the mentioned security agent.

It should be noted that similar to many other security products, remote browsing parameters may be configured by a user (e.g., an administrator). That is, a user may set threshold limits for each of the above mentioned remote browsing parameters, which when met or exceeded, the remote browsing agent may send a corresponding request for web browsing to a remote server. Additionally, as discussed above, in some cases (e.g., when a corresponding remote browsing parameter is related to the device's status, such as the battery or storage status), the user may be given an option to explicitly switch over to remote browsing.

In some cases, the remote browsing agent may determine to perform local browsing (or direct browsing) even though, based on one or more of the above-mentioned parameters, remote browsing may seem to be more preferable. One example may include privacy concerns. That is, no matter how secure a device, website, user, or network may be, in some embodiments, privacy of the users dictates the policy for remote browsing. For example, in some embodiments, irrespective of the security of the device, website, user, or network, the remote browsing agent performs local browsing when users are accessing highly sensitive personal information. In some embodiments, the remote browsing agent may be configured to perform local browsing when a website contains sensitive personal information (e.g., a banking website or a healthcare website), for example, to reduce the user's web browsing footprint and to make personal identification and identity theft more difficult.

Another example in which local browsing may be preferable (even through the remote browsing parameters indicate otherwise) is incomplete or improper page rendering. For example, since remote browsing solutions may sanitize and re-render the original content, some of the original properties of the webpage may be lost (e.g., auto-refresh of content on news websites). In some embodiments, important websites which may be rendered improperly can be added, for example, to a customer configurable whitelist for local browsing. Such a whitelist may be synced with other data provided by security agents (e.g., the security agents described above) such that all user devices may use local browsing for such websites. As described above, in some embodiments, a user (e.g., an admin) may be able to control the process of updating such a whitelist. For example, once a user raises a request, the admin may perform the necessary steps of checking, and if satisfied, add the website to the whitelist of local browsing websites. Additionally, in some cases, the remote browsing agent may provide additional security by loading such webpages on a separate disposable container (or a sandboxed process) on the user's local device, or even by utilizing additional methods of isolation, such as disabling scripts on risky webpages (e.g., using content security policy (CSP) headers).

In some embodiments, the determination on whether to perform a browsing remotely or locally may depend on a combination of two or more parameters (e.g., combination of user-related, device-related, network-related, and/or content-related parameters) in some embodiments. For example, the decision may be made based on the network bandwidth and also the content of the webpage. As another example, the decision may be made based on the remaining battery power of the device and the content of the webpage (or the network bandwidth). Additionally, as described, the determination on whether to perform a browsing remotely or locally may be on a per user, per tab, and/or per device basis. For example, a particular webpage (or web tab) for a particular user on a device may be determined to be performed remotely, while the same webpage for a different user on the same device may be determined to be performed locally.

Returning to FIG. 3, when process 300 determines (at 320) to process the request locally, the process performs (at 330) the browsing tab (or session) on a browsing application of the device. The process then ends. On the other hand, if process 300 determines to process the request remotely, the process transmits (at 340) the request to a remote server to perform the browsing session remotely. As described above, the remote server may be a host machine (e.g., host machine 105, with reference to FIG. 1) of a datacenter. As such, the remote server may initialize a VCI (e.g., a container, a VM, etc.) for performing the browsing session. As such, no cyber-attack originated from the browsing session may threaten the local device. In some embodiments, after the termination of the browsing session, the VCI that performs the browsing session may also be terminated. The process then ends.

The specific operations of process 300 may not be performed in the exact order shown and described. Additionally, the specific operations may not be performed in one continuous series of operations, and different specific operations may be performed in different embodiments. For example, before transmitting the request (at 340) to a remote server, process 300 of some embodiments sends a notification to the user informing the user of a possible security breach (or any other reason) for which remote browsing of the webpage or the entire web session is required. In some embodiments, after the user confirms the remote browsing, process 300 transmits the request for remote browsing (or may migrate the entire browsing session (if one is ongoing)) to the remote server. In some embodiments, after the user confirms the migration of a website (e.g., a browsing tab or session associated with the website) to the remote server for remote browsing, all future accesses to such a website may be regularly monitored and all future browsing of the website may also be performed remotely (e.g., does not need additional confirmation from the user to be performed remotely).

Figure 4:
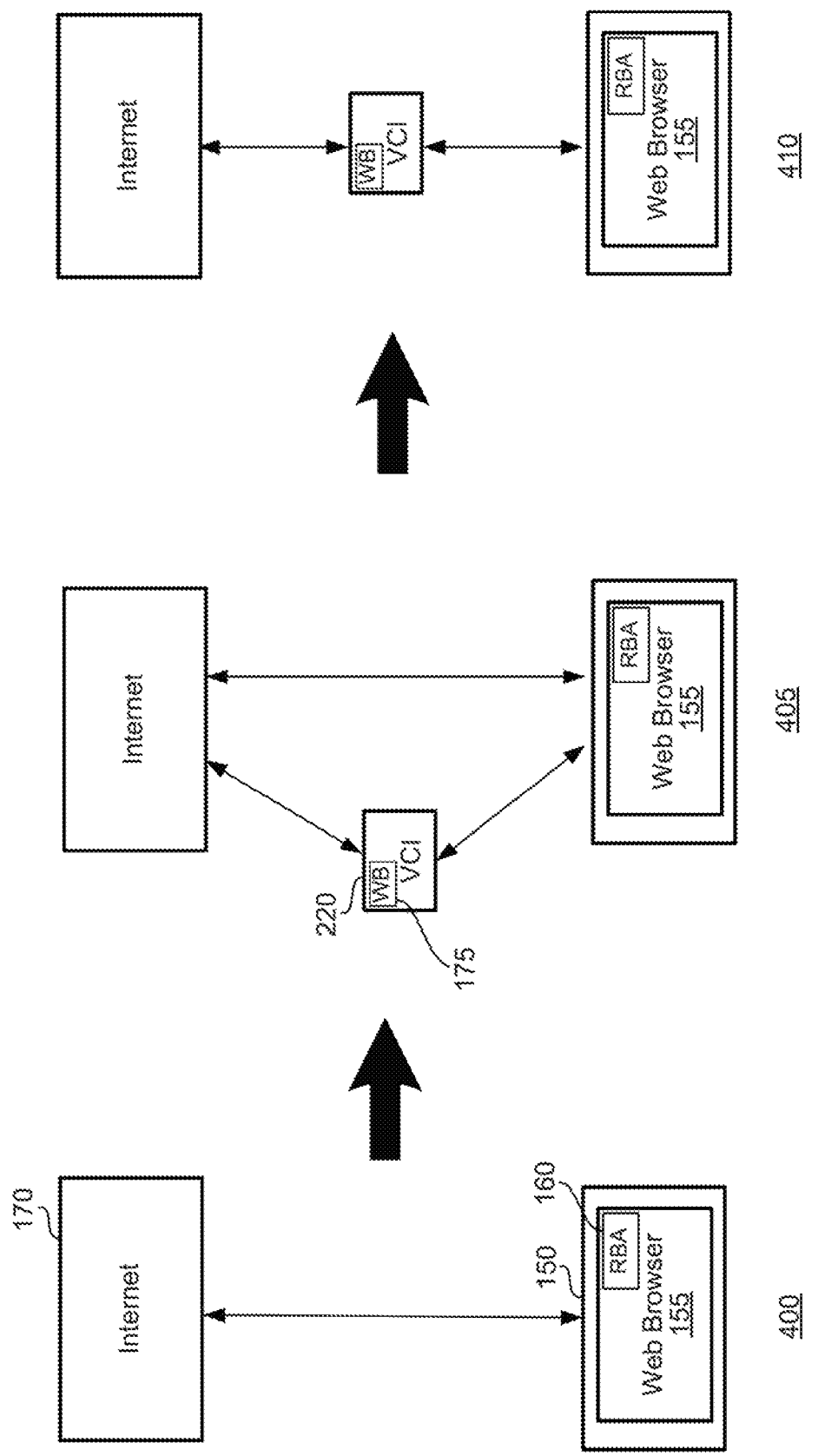
FIG. 4 illustrates an example of dynamic transmission of a browsing session between local browsing and remote browsing, according to an example embodiment of the present application.

FIG. 4 illustrates an example of dynamic transmission of a browsing session between local browsing and remote browsing, according to an example embodiment of the present application. Specifically, this figure shows, through three different stages 400, 405, and 410, how a browsing session may be performed locally, remotely, or a combination of both according to some embodiments.

At stage 400, a web browser 410 is connected to Internet 430 (e.g., through one or more private and/or public networks) and performs a browsing session locally. For example, based on one or more parameters, as described above, web browser 410 (e.g., a remote browsing agent within the web browser) may have determined that it is safe to perform the browsing session locally and may be displaying a webpage from a website of Internet 430 on the local device of a user.

At stage 405, as illustrated, part of the browsing session is performed remotely on VCI 420, while another part of the browsing session is performed locally on the local device of the user. For example, at this stage, the user may have requested a new browsing tab to be opened for a new webpage from the same website or a different website. After receiving such a request, the remote browsing agent may have determined, based on one or more of the above-mentioned parameters, that the new browsing tab has to be performed remotely (e.g., for lack of security). After making such a determination, web browser 410 may transmit the request for the new browsing tab to VCI 420 to perform a browsing session for the new tab, while the previous browsing tab is still performed locally on the local device of the user. Therefore, as shown in the figure, part of the browsing session of the same user is performed locally and the other part of the browsing session is performed remotely in some embodiments.

At stage 410, the entire web browsing session has been transferred from local browsing to remote browsing. That is, at stage 405, web browser 410 is not performing any part of the browsing session locally, and the entire browsing session is being done remotely via VCI 420. For example, at this stage, the battery power of the device may have reached a critical threshold. As such, the remote browsing agent determines that the entire browsing session should be migrated to VCI 420. As another example, while browsing one of the remote or local webpages (or tabs), the user (or an application) may request for an insecure webpage to be opened, which may initiate a cyber-attack on the device. After receiving the security information about the new webpage, in order to protect the user device, the remote browsing agent may transmit the entire browsing session to VCI 420 for remote browsing.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method for managing one or more browsing tabs of one or more browsing sessions on an electronic device, the method comprising, during a browsing session:
receiving, from a processor of the electronic device, a message indicating a value for a parameter associated with a status of the electronic device;
for each respective browsing tab of the one or more browsing tabs, determining whether to process the respective browsing tab locally on the electronic device based on the value for the parameter;
when it is determined to process the one or more browsing tabs locally, performing the one or more browsing tabs locally on the electronic device; and
when it is determined not to process the one or more browsing tabs locally, processing a request for the one or more browsing tabs at a remote server or migrating the one or more browsing tabs to the remote server to perform the one or more browsing tabs remotely on the remote server; wherein
determining whether to process the respective browsing tab locally comprises determining not to process the respective browsing tab locally in response to determining that the respective browsing tab is high-consumption for the parameter and that the value indicates the electronic device is running low on a resource associated with the parameter.

2. The method of claim 1, wherein determining whether to process one or more browsing tabs locally on the electronic device comprises determining whether to process a request for the one or more browsing tabs locally on the electronic device, the method further comprising:
when it is determined to process the request locally, locally performing the one or more browsing tabs and at least one other browsing tab associated with a user associated with the browsing session.

3. The method of claim 1, wherein the remote server processes the request in a virtual computing instance executing on the remote server.

4. The method of claim 1, further comprising:
providing a user of the electronic device an option to select not to perform the one or more browsing tabs locally, and determining whether to process a request for a selected tab locally on the electronic device based on whether the user selects not to perform the one or more browsing tabs locally.

5. A method for managing one or more browsing tabs of one or more browsing sessions on an electronic device, the method comprising, during a browsing session:
determining whether to process one or more browsing tabs locally on the electronic device based on one or more parameters associated with a status of the electronic device;
when it is determined to process the one or more browsing tabs locally, performing the one or more browsing tabs locally on the electronic device; and
when it is determined not to process the one or more browsing tabs locally, processing a request for the one or more browsing tabs at a remote server or migrating the one or more browsing tabs to the remote server to perform the one or more browsing tabs remotely on the remote server; wherein at least one of the one or more parameters relates to security of the electronic device and comprises at least one of:
a security feed received from an agent that monitors the electronic device; and
security data that indicates suspicious activity detected on the electronic device or that indicates a vulnerability of a browser of the electronic device on which the browsing session is performed.

6. A method for managing one or more browsing tabs of one or more browsing sessions on an electronic device, the method comprising, during a browsing session:
determining whether to process one or more browsing tabs locally on the electronic device based on one or more parameters associated with a status of the electronic device;
when it is determined to process the one or more browsing tabs locally, performing the one or more browsing tabs locally on the electronic device; and
when it is determined not to process the one or more browsing tabs locally, processing a request for the one or more browsing tabs at a remote server or migrating the one or more browsing tabs to the remote server to perform the one or more browsing tabs remotely on the remote server; wherein
at least one of the one or more parameters relates to security of the electronic device and comprises at least one of:
whether the electronic device is jailbroken;
whether a malicious application is installed on the electronic device; or
whether a mandated security application is installed and running on the electronic device.

7. The method of claim 1, wherein the parameter comprises a battery status of the electronic device or a remaining storage of the electronic device.

8. The method of claim 1, wherein the parameter comprises an amount of data needed to be communicated during the browsing session and a network bandwidth provided to the electronic device during the browsing session.

9. The method of claim 1, wherein the request includes a destination website associated with the request, wherein the parameter comprises one or more applications on which the destination website relies.

10. A non-transitory computer readable medium comprising instructions that, when executed by one or more processors of an electronic device, cause the electronic device to perform a method for managing one or more browsing tabs of one or more browsing sessions on the electronic device, the method comprising, during a browsing session:
receiving, from a processor of the electronic device, a message indicating a value for a parameter associated with a status of the electronic device;
for each respective browsing tab of the one or more browsing tabs, determining whether to process the respective browsing tab locally on the electronic device based on the value for the parameter;
when it is determined to process the one or more browsing tabs locally, performing the one or more browsing tabs locally on the electronic device; and
when it is determined not to process the one or more browsing tabs locally, processing a request for the one or more browsing tabs at a remote server or migrating the one or more browsing tabs to the remote server to perform the one or more browsing tabs remotely on the remote server; wherein
determining whether to process the respective browsing tab locally comprises determining not to process the respective browsing tab locally in response to determining that the respective tab is high-consumption for the parameter and that the value indicates the electronic device is running low on a resource associated with the parameter.

11. The non-transitory computer readable medium of claim 10, wherein determining whether to process one or more browsing tabs locally on the electronic device comprises determining whether to process a request for the one or more browsing tabs locally on the electronic device, the method further comprising:
when it is determined to process the request locally, locally performing the one or more browsing tabs and at least one other browsing tab associated with a user associated with the browsing session.

12. The non-transitory computer readable medium of claim 10, wherein the remote server processes the request in a virtual computing instance executing on the remote server.

13. The non-transitory computer readable medium of claim 10, the method further comprising:
providing a user of the electronic device an option to select not to perform the one or more browsing tabs locally, and determining whether to process a request for a selected tab locally on the electronic device based on whether the user selects not to perform the one or more browsing tabs locally.

14. A non-transitory computer readable medium comprising instructions that, when executed by one or more processors of an electronic device, cause the electronic device to perform a method for managing one or more browsing tabs of one or more browsing sessions on the electronic device, the method comprising, during a browsing session:
determining whether to process one or more browsing tabs of a plurality of browsing tabs locally on the electronic device based on one or more parameters associated with a status of the electronic device;
when it is determined to process the one or more browsing tabs locally, performing the one or more browsing tabs locally on the electronic device; and
when it is determined not to process the one or more browsing tabs locally, sending a request for the one or more browsing tabs to a remote server or migrating the one or more browsing tabs to the remote server to perform the one or more browsing tabs remotely on the remote server; wherein at least one of the one or more parameters relates to security of the electronic device and comprises at least one of:
a security feed received from an agent that monitors the electronic device; and
security data that indicates suspicious activity detected on the electronic device or that indicates a vulnerability of a browser of the electronic device on which the browsing session is performed.

15. The non-transitory computer readable medium of claim 10, wherein the parameter comprises a battery status of the electronic device or a remaining storage of the electronic device.

16. The non-transitory computer readable medium of claim 10, wherein the request includes a destination website associated with the request, wherein the parameter comprises one or more applications on which the destination website relies.

17. An electronic device, comprising:
a memory; and
at least one processor coupled to the memory, the at least one processor being configured to, during a browsing session comprising one or more browsing tabs:
receive, from a processor of the electronic device, a message indicating a value for a parameter associated with a status of the electronic device;
for each respective browsing tab of the one or more browsing tabs, determine whether to process the respective browsing tab locally on the electronic device based on the value for the parameter;
when it is determined to process the one or more browsing tabs locally, perform the one or more browsing tabs locally on the electronic device; and
when it is determined not to process the one or more browsing tabs locally, process a request for the one or more browsing tabs at a remote server or migrating the one or more browsing tabs to the remote server to perform the one or more browsing tabs remotely on the remote server; wherein
determining whether to process the respective browsing tab locally comprises determining not to process the respective browsing tab locally in response to determining that the respective tab is high-consumption for the parameter and that the value indicates the electronic device is running low on a resource associated with the parameter.

18. The electronic device of claim 17, wherein the at least one processor is further configured to:
determine whether to process a request for the one or more browsing tabs locally on the electronic device; and
when it is determined to process the request locally, locally perform the one or more browsing tabs and at least one other browsing tab associated with a user associated with the browsing session.

19. The electronic device of claim 17, wherein the at least one processor is further configured to:
providing a user of the electronic device an option to select not to perform the one or more browsing tabs locally, and determining whether to process a request for a selected tab locally on the electronic device based on whether the user selects not to perform the one or more browsing tabs locally.

20. An electronic device, comprising:
a memory; and
at least one processor coupled to the memory, the at least one processor being configured to, during a browsing session:
determine whether to process one or more browsing tabs of a plurality of browsing tabs locally on the electronic device based on one or more parameters associated with a status of the electronic device;
when it is determined to process the one or more browsing tabs locally, perform the one or more browsing tabs locally on the electronic device; and
when it is determined not to process the one or more browsing tabs locally, send a request for the one or more browsing tabs to a remote server or migrate the one or more browsing tabs to the remote server to perform the one or more browsing tabs remotely on the remote server; wherein at least one of the one or more parameters relates to security of the electronic device and comprises at least one of:
a security feed received from an agent that monitors the electronic device; and
security data that indicates suspicious activity detected on the electronic device or that indicates a vulnerability of a browser of the electronic device on which the browsing session is performed.

21. The method of claim 1, wherein determining whether to process one or more browsing tabs locally on the electronic device based on one or more parameters associated with the status of the electronic device comprises:
   determining the electronic device is low on batteries based on the value;
   determining a first browsing tab of the one or more browsing tabs is high consumption;
   migrating the first browsing tab;
   determining a second browsing tab of the one or more browsing tabs is not high consumption; and
   performing the second browsing tab locally.

* * * * *